UNITED STATES PATENT OFFICE.

PATRICK B. BONNER, OF NEW YORK, N. Y.

IMPROVED MODE OF SOLDERING GALVANIZED IRON.

Specification forming part of Letters Patent No. 83,451, dated October 27, 1868.

*To all whom it may concern:*

Be it known that I, PATRICK B. BONNER, of New York, in the county of New York and State of New York, have invented a new and useful Improvement in Soldering Galvanized Iron; and I do hereby declare that the following is a full, clear, and exact description thereof, which will enable others skilled in the art to make and use the same.

My invention has for its object to improve the manner of soldering galvanized iron, so that the solder may not crack or break off, and will make the seam perfectly tight; and it consists in the process of soldering hereinafter more fully described.

The seam in the iron to be soldered is formed in the ordinary manner. The seam which is to receive the solder first receives a coat of acid.

The acid used is muriatic acid, prepared as follows: To one gallon of acid I add two gallons of water and one pint of spirits of wine.

The acid, thus prepared, when applied to the galvanized iron, not only cleans the iron, but also so acts upon the galvanizing that when the copper is applied the galvanizing is wholly removed and replaced with a coating of solder.

As the copper is removed, and while the solder is still hot and soft, the seam is smoothed or rubbed with a white linen or cotton cloth, (I prefer linen, as it lasts longer,) which removes the galvanizing, and leaves the seam perfectly smooth and tight, and wholly free from the roughness and porousness unavoidable in soldering galvanized iron in the ordinary manner.

Solder applied in this way will never peel off, and should such a strain be applied to a seam thus soldered as to start the seam, the solder will be broken, but will never peel or scale off.

Having thus described my invention, what I claim as new, and desire to secure by Letters Patent, is—

The process of soldering galvanized iron, substantially as herein described and set forth.

The above specification of my invention signed by me this 27th day of August, 1868.

P. B. BONNER.

Witnesses:
ALEX. F. ROBERTS,
JAMES T. GRAHAM.